US 8,108,271 B1

(12) United States Patent
Duncan et al.

(10) Patent No.: US 8,108,271 B1
(45) Date of Patent: Jan. 31, 2012

(54) METHOD AND APPARATUS FOR LOWER OF COST OR MARKET VALUE MONITORING AND NOTIFICATION

(75) Inventors: David Audley Duncan, Orem, UT (US); Marsha Terry, Orem, UT (US); Michael Amore Scalora, Orem, UT (US); Bradley R. Lamb, Pleasant Grove, UT (US)

(73) Assignee: Intuit Inc., Mountain View, CA (US)

( * ) Notice: Subject to any disclaimer, the term of this patent is extended or adjusted under 35 U.S.C. 154(b) by 1247 days.

(21) Appl. No.: 11/489,157

(22) Filed: Jul. 18, 2006

(51) Int. Cl.
*G06Q 10/00* (2006.01)
*G06Q 40/00* (2006.01)
(52) U.S. Cl. .......................... 705/28; 705/37
(58) Field of Classification Search .................. 705/28
See application file for complete search history.

(56) References Cited

U.S. PATENT DOCUMENTS

| | | | | |
|---|---|---|---|---|
| 2003/0083947 | A1* | 5/2003 | Hoffman et al. | 705/22 |
| 2005/0131785 | A1* | 6/2005 | Yap | 705/35 |
| 2005/0289039 | A1* | 12/2005 | Greak | 705/37 |
| 2009/0018891 | A1* | 1/2009 | Eder | 705/10 |

* cited by examiner

*Primary Examiner* — Garcia Ade
(74) *Attorney, Agent, or Firm* — Gunnison, McKay & Hodgson, L.L.P.; Philip McKay

(57) ABSTRACT

A method and apparatus for lower of cost or market value monitoring includes a process for lower of cost or market value monitoring and notification whereby data representing the identification and purchase price of an inventory item is obtained and the market value of the inventory item is automatically monitored on a periodic basis. Data representing the purchase price of the inventory item is then periodically compared with data representing the market value of the inventory item and when the market value of the inventory item decreases below the purchase price of the inventory item a notification/alert is generated bringing the drop in market value of the inventory item below the price paid for the inventory item to the user's attention.

34 Claims, 6 Drawing Sheets

ALERT!
THE MARKET VALUE OF INVENTORY ITEM A IS ESTIMATED TO HAVE DECRESED TO $1.00. THE PURCAHSE PRICE FOR INVENTORY ITEM A WAS $1.50. CONSEQUENTLY THE MARKET PRICE FOR INVETNORY ITEM A IS $0.50 BELOW THE PURCAHSE PRICE. YOU HAVE 1000 UNITS OF INVETNORY ITEM A IN STOCK. CONSEQUENTLY YOUR CURRENT STOCK OF INVETNORY ITEM A YEILDS AN ESTOMATED $500.00 LOSS

Please Indicate Receipt of this Alert by Clicking on the "RECIEVED" Box Provided Below

243 ☐ RECIEVED

FIG. 2B

METHOD AND APPARATUS FOR LOWER OF COST OR MARKET VALUE MONITORING AND NOTIFICATION

BACKGROUND

Many businesses, such as wholesale and retail establishments, deal in numerous items or products that are either offered directly for sale, or are used in connection with a service offered by the business. Often large quantities of each of these items must be kept in inventory, i.e., purchased and stored/warehoused by, or for, the business owner for extended periods of time to ensure the items are available when needed. In addition, it is often cost-effective to purchase large quantities of a given inventory item in order to take advantage of volume discounting.

As a result, many businesses often have large amounts of operating capital invested in various inventory items owned by the business and stored/warehouse either by, or for, the business. Consequently, a significant portion of the value of a business having large quantities of inventory items is the market value, or market price, of the inventory owned by that business. Therefore, any accurate measure of the value of a business at a given time is based, at least in part, on the market value of the inventory. Consequently, any instance or situation where the value of the business needs to be determined accurately, such as when lines of credit, and interest on the credit, is based on the business value as collateral, requires a knowledge of the market value of inventory. In addition, any instance when the business owner desires to project future profits also requires knowledge of the market value of inventory versus the price paid for that inventory.

As an example, the tax liability/credit of a business maintaining large quantities of inventory is often also based, in part, on the market value of the inventory owned by that business and the projected profit from the sale of the inventory. In particular, standard accounting procedures use the Lower of Cost or Market Value (LCM) of an inventory item to determine projected profits associated with the sale of the inventory item, and therefore, the tax liability associated with the sale of the inventory item. Using LCM analysis, when the market value of an inventory item falls below the price the business owner paid for the inventory item, the difference between the price paid for the inventory item and the market value of the inventory item is treated as an expense against projected profits and this expense can be used to offset the business's tax liability by expensing the differential portion of the inventory cost.

For at least the reasons discussed above, it is often in the best interest of a business owner maintaining significant inventory to closely monitor the market value of his or her inventory. However, the time and energy necessary to monitor fluctuations in the market value of often numerous inventory items, and compare the market value of the inventory item with the purchase price of the inventory item, is frequently viewed by the business owner as unacceptable and not worth the effort. This is particularly true in the case of small businesses where the small-business owner and/or his or her employees are busy running the business and have little, or no, time for monitoring the market value of inventory. In addition, small-business owner's often feel, in many instances correctly feel, that the potential tax benefits of monitoring the market value of inventory items does not justify the resources, such as employee time or money, necessary to either pay a third party or hire a dedicated employee to monitor the market value of inventory items. Consequently, currently, many business owners choose to ignore the market value of inventory and therefore forgo the opportunity to expense part of their inventory cost and decrease their tax liability.

SUMMARY

In accordance with one embodiment, a method and apparatus for lower of cost or market value monitoring includes a process for lower of cost or market value monitoring and notification whereby data representing the identification and purchase price of an inventory item is obtained. The market value of the inventory item is then automatically monitored on a periodic basis. Data representing the purchase price of the inventory item is then periodically compared with data representing the market value of the inventory item. In one embodiment, when the market value of the inventory item decreases below the purchase price of the inventory item, a notification/alert is generated bringing the drop in market value of the inventory item below the price paid for the inventory item to the user's attention.

In one embodiment, the identification and purchase price of the inventory item data is obtained and stored through a computing system implemented financial management system being used by the business owner.

In one embodiment the market value of the inventory item is monitored by linking the inventory item to one or more publicly available web sites offering the inventory item for sale, or otherwise listing a market value for the inventory item, and periodically and automatically checking the sale price of the inventory item on the web site or sites. In one embodiment the market value of the inventory item is monitored by subscribing, or otherwise linking, to a dedicated database listing the market value or recent sale prices for the inventory item.

In one embodiment, the user is provided the opportunity to define a threshold differential value between the purchase price of an inventory item and the market value of the inventory item whereby, only when the market value of an inventory item drops below the purchase price of the inventory item by the defined threshold value does the process for lower of cost or market value monitoring and notification alert the user.

In one embodiment, the purchase price of the inventory item data and the market value of the inventory item data are compared using any one of the numerous comparison mechanisms, either implemented in software or hardware, known to those of skill in the art, either at the time of filing or as later developed.

In one embodiment, when it is detected that the market value of the inventory item drops either below the purchase price of the inventory item, or in one embodiment, drops below the purchase price of the inventory item by the defined threshold differential value between the market value of the inventory item and the purchase price of the inventory item, the user and/or a third-party, such as the user's accountant, is automatically alerted to the drop in market value of the inventory item.

In one embodiment, in addition to alerting the user and/or the third-party of the drop in market value of the inventory item, the information regarding the differential between the market value of the inventory item and the purchase price of the inventory item, i.e., the lower of cost or market value (LCM) adjustment data, is sent directly to a computing system implemented financial management system, such as a computing system implemented business financial management system or a computing system implemented tax preparation system, for further use and/or processing of the data.

Using the method and apparatus for lower of cost or market value monitoring and the process for lower of cost or market value monitoring and notification disclosed herein, a user, such as a small-business owner, can automatically monitor the market value of the business's inventory and compare the market value of the inventory with the price paid for the inventory without devoting significant time or resources to the process. Consequently, using the method and apparatus for lower of cost or market value monitoring and the process for lower of cost or market value monitoring and notification disclosed herein, the potential business and tax benefits of monitoring the market value of inventory items can be enjoyed without devoting significant amounts time, or the expense of paying a third party or hiring a dedicated employee, to monitor the market value of inventory items.

In addition, as discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 2B shows one embodiment of an alert generated and displayed on a display device in accordance with one embodiment;

Figure 1:
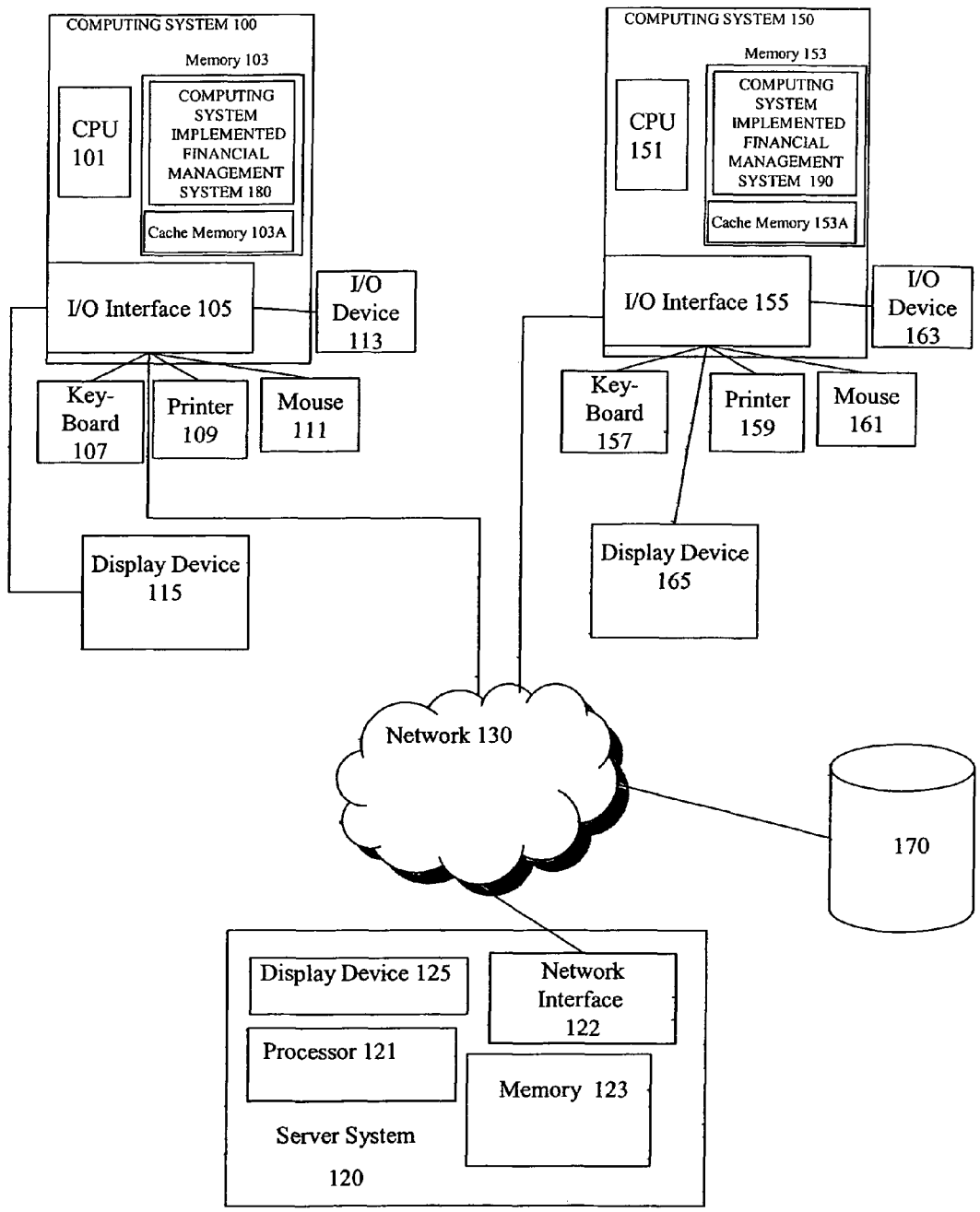
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and apparatus for lower of cost or market value monitoring and notification includes a process for lower of cost or market value monitoring and notification (200 in FIG. 2A, 300 in FIG. 3, 400 in FIG. 4, and 500 in FIG. 5) whereby data representing the identification and purchase price of an inventory item is obtained. The market value of the inventory item is then automatically monitored on a periodic basis. Data representing the purchase price of the inventory item is then periodically compared with data representing the market value of the inventory item. In one embodiment, when the market value of the inventory item decreases below the purchase price of the inventory item, an alert is generated bringing the drop in market value of the inventory item below the price paid for the inventory item to the user's attention.

In one embodiment, the user is provided the opportunity to define a threshold differential value between the purchase price of the inventory item and the market value of the inventory item whereby, only when the market value of the inventory item drops below the purchase price of the inventory item by the defined threshold value does the process for lower of cost or market value monitoring and notification alert the user.

In one embodiment, when it is detected that the market value of the inventory item drops either below the purchase price of the inventory item, or in one embodiment, drops below the purchase price of the inventory item by the defined threshold differential value between the market value of the inventory item and the purchase price of the inventory item, the user and/or a third-party, such as the user's accountant, is automatically alerted to the drop in market value of the inventory item.

In one embodiment, in addition to alerting the user and/or the third-party of the drop in market value of the inventory item, the information regarding the differential between the market value of the inventory item and the purchase price of the inventory item, i.e., the lower of cost or market value (LCM) adjustment data, is sent directly to a computing system implemented financial management system, such as a computing system implemented business financial management system or a computing system implemented tax preparation system, for further application of the data and/or further processing.

Using the method and apparatus for lower of cost or market value monitoring and the process for lower of cost or market value monitoring and notification disclosed herein, a user, such as a small-business owner, can automatically monitor the market value of the business's inventory and compare the market value of the inventory with the price paid for the inventory without devoting significant time or resources to the process. Consequently, using the method and apparatus for lower of cost or market value monitoring and the process for lower of cost or market value monitoring and notification disclosed herein, the potential business and tax benefits of monitoring the market value of inventory items can be enjoyed without devoting significant amounts time, or the expense of paying a third party or hiring a dedicated employee, to monitor the market value of inventory items.

As used herein, the term computing system implemented financial management system includes, but is not limited to: computing system implemented business financial management systems, packages, programs, modules, or applications; computing system implemented inventory and sales tracking systems, packages, programs, modules, or applications; computing system implemented personal and small business financial management systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether available or known at the time of filing or as developed later.

For illustrative purposes, embodiments are described within the framework of, and using, one or more computing system implemented financial management systems. However, some embodiments are stand alone software programs, packages or applications capable of independent implementation. This and other various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether available or known at the time of filing or as developed later. Some embodiments are implemented in a mobile computing system running mobile operating systems such as Symbian® OS, Windows® Mobile, or any other operating system designed to generally manage operations on a mobile computing system, whether available or known at the time of filing or as developed later. As described more fully below, embodiments can be implemented on computing systems other than a conventional computing system such as, for example, a personal digital assistant, a cell phone, or other computing system capable of processing computer readable data, whether available at the time of filing or as developed later. Computing systems also include those in which one or more computing resources (hardware or software) are located remotely and accessed via network, such as a Local Area Network (LAN), Wide Area Network (WAN), a public network, such as the Internet, a private network, or other electronic medium in which data may be exchanged between one computing system and one or more other computing system(s), whether available at the time of filing or as developed later. Embodiments may be included as add-on software for existing software programs, packages or applications, and embodiments may be a feature of an application that is bundled with a computing system or sold separately. Some embodiments are stand alone software programs, packages or applications capable of independent implementation. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the computing system implemented financial management systems described herein make use of input provided to the computer device implementing the process and/or application for lower of cost or market value monitoring and notification, discussed herein, via user interface devices such as a keyboard, mouse, touchpad, or any other device capable of providing user input to a computing system or for translating user actions into computing system operations, whether available or known at the time of filing or as developed later.

Hardware System Architecture

FIG. 1 is a block diagram of an exemplary hardware architecture for implementing one embodiment of a method and apparatus for lower of cost or market value monitoring and notification, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more computing system implemented financial management systems 180 stored, in whole, or in part, therein, that are a parent system for, are used by, or include, as discussed below, a process and/or application for lower of cost or market value monitoring and notification, such as processes 200, 300, 400, and 500, discussed below.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether available or known at the time of filing or as later developed. As discussed in more detail below, in one embodiment, a process and/or application for lower of cost or market value monitoring and notification, such as processes 200, 300, 400, and 500, and a computing system implemented financial management system 180, can be loaded, in whole, or in part, into computing system 100 via I/O device 113, such as from a CD, DVD or floppy disk containing all, or part, of computing system implemented financial management system 180.

Similarly, computing system 150 typically includes a central processing unit (CPU) 151, hereinafter processor 151, an input/output (I/O) interface 155, and a memory system 153, including cache memory 153A. In one embodiment, memory system 153 includes one or more computing system implemented financial management systems 190 stored, in whole, or in part, therein, that are a parent system for, are used by, or include, as discussed below, a process and/or application for lower of cost or market value monitoring and notification, such as processes 200, 300, 400, and 500.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process and/or application for lower of cost or market value monitoring and notification, such as processes 200, 300, 400, and 500, and a computing system implemented financial management system 190, can be loaded, in whole, or in part, into computing system 150 via I/O device 163, such as from a CD, DVD or floppy disk containing all, or part, of computing system implemented financial management system 190.

Also shown in FIG. 1 is database 170. In one embodiment, database 170 is a designated server system or computing system, or a designated portion of a server system or computing system, such as computing systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process and/or application for lower of cost or market value monitoring and notification, such as processes 200, 300, 400, and 500, and/or computing system implemented financial management system 180 and/or computing system implemented financial management system 190 are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process and/or application for lower of cost or market value monitoring and notification, such as processes 200, 300, 400, and 500, and a computing system implemented financial management system 180 and/or computing system implemented financial management system 190 are stored in whole, or in part, in server system 120.

Network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process and/or application for lower of cost or market value monitoring and notification, such as processes 200, 300, 400, and 500, and a computing system implemented financial management system 180 and/or computing system implemented financial management system 190 are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for lower of cost or market value monitoring and notification, such as processes for lower of cost or market value monitoring and notification 200, 300, 400, and/or 500, and a computing system implemented financial management system, such as computing system implemented financial management systems 180 and/or 190, are sometimes referred to herein, alternatively, as a process, an application, a module, a program, a component of a software system, a component of a software package, a component of a parent system, or a feature of a parent system, this terminology is illustrative only. In some embodiments, a process and/or application for lower of cost or market value monitoring and notification, such as processes 200, 300, 400, and 500, and a computing system implemented financial management system, such as computing system implemented financial management systems 180 and/or 190, discussed herein, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and 151, or server system processor 121. In one embodiment, execution of a process and/or application for lower of cost or market value monitoring and notification, such as processes 200, 300, 400, and 500, and a computing system implemented financial management system, such as computing system implemented financial management systems 180 and/or 190, discussed herein, by processor 101, processor 151, or server system processor 121, results in the operations of an agent computer process (not shown) and/or a rule computer process (not shown).

In one embodiment, a process and/or application for lower of cost or market value monitoring and notification, such as processes 200, 300, 400, and 500, and a computing system implemented financial management system, such as computing system implemented financial management systems 180 and/or 190, discussed herein, are a computer application or process implemented and/or run and/or stored, in full, or in part, in, or on, a computer program product. Herein, a computer program product comprises a medium configured to store or transport computer readable code, whether available or known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, the medium also may be removed from the computing system.

For example, all, or part, of a process and/or application for lower of cost or market value monitoring and notification, such as processes 200, 300, 400, and 500, and a computing system implemented financial management system, such as computing system implemented financial management systems 180 and/or 190, discussed herein, may be stored in a memory that is physically located in a location, such as server system memory 123, or database 170, of FIG. 1, different from a computing system, such as computing systems 100 and/or 150 of FIG. 1, utilizing a process and/or application for lower of cost or market value monitoring and notification, such as processes 200, 300, 400, and 500, and a computing system implemented financial management system, such as computing system implemented financial management systems 180 and/or 190. In one embodiment, all, or part, of a process and/or application for lower of cost or market value monitoring and notification, such as processes 200, 300, 400, and 500, and a computing system implemented financial management system, such as computing system implemented financial management systems 180 and/or 190, discussed herein, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process and/or application for lower of cost or market value monitoring and notification, such as processes 200, 300, 400, and 500, and a computing system implemented financial management system, such as computing system implemented financial management systems 180 and/or 190, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process and/or application for lower of cost or market value monitoring and notification, such as processes 200, 300, 400, and 500, and a computing system implemented financial management system, such as computing system implemented financial management systems 180 and/or 190, discussed herein, in accordance with at least one of the embodiments as described herein. Similarly, in another embodiment, a process and/or application for lower of cost or market value monitoring and notification, such as processes 200, 300, 400, and 500, and a computing system implemented financial management system, such as computing system implemented financial management systems 180 and/or 190, discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

In one embodiment, a process for lower of cost or market value monitoring and notification obtains data representing the identification and purchase price of an inventory item. The market value of the inventory item is then automatically monitored on a periodic basis. Data representing the identification and purchase price of the inventory item is then periodically compared with data representing the market value of the inventory item. In one embodiment, when the market value of the inventory item decreases below the purchase price of the inventory item, an alert is generated bringing the drop in market value of the inventory item below the price paid for the inventory item to the user's attention.

Figure 2A:
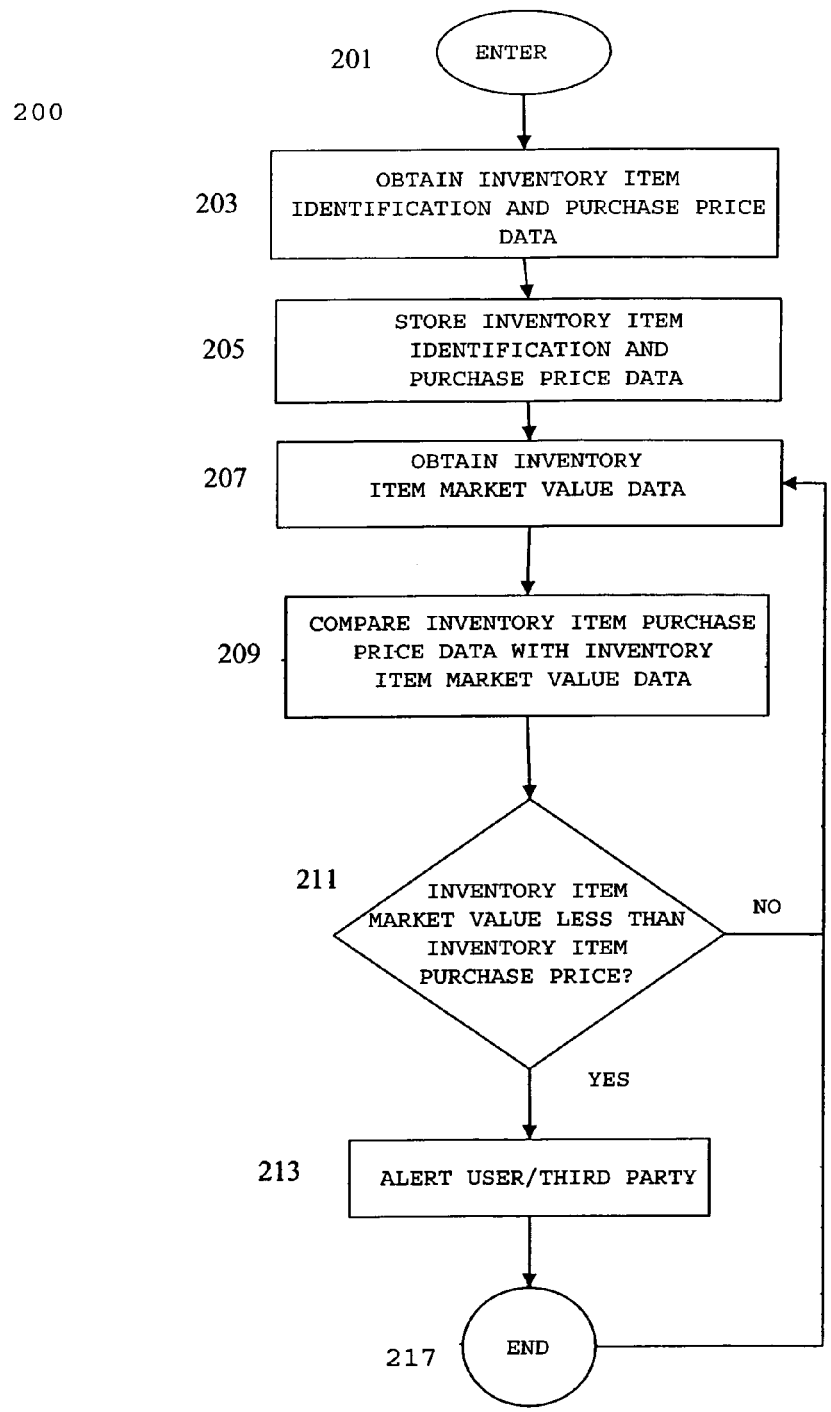
FIG. 2A is a flow chart depicting a process for lower of cost or market value monitoring and notification in accordance with one embodiment.

FIG. 2A is a flow chart depicting a process for lower of cost or market value monitoring and notification 200 in accordance with one embodiment. Process for lower of cost or market value monitoring and notification 200 begins at ENTER OPERATION 201 and process flow proceeds to OBTAIN INVENTORY ITEM IDENTIFICATION AND PURCHASE PRICE DATA OPERATION 203.

At OBTAIN INVENTORY ITEM IDENTIFICATION AND PURCHASE PRICE DATA OPERATION 203, data regarding the identification of an inventory item and the purchase price a user paid for the inventory item, or a plurality of the inventory items, is obtained by any one of several methods known to those of skill in the art, at the time of filing or as developed later.

In one embodiment, data regarding the identification of an inventory item and the purchase price a user paid for the inventory item, or a plurality of the inventory items, is obtained at OBTAIN INVENTORY ITEM IDENTIFICATION AND PURCHASE PRICE DATA OPERATION 203 through manual entry of the information by the user using a user interface device such as a keyboard, such as keyboard 107, 157, of FIG. 1, a mouse, such as mouse 111, 161 of FIG. 1, a touchpad, a voice recognition system, or any other device capable of providing user input to a computing system or for translating user actions into computing system operations, whether available or known at the time of filing or as developed later.

Returning to FIG. 2A, in one embodiment, data regarding the identification of an inventory item and the purchase price a user paid for the inventory item, or a plurality of the inventory items, is obtained at OBTAIN INVENTORY ITEM IDENTIFICATION AND PURCHASE PRICE DATA OPERATION 203 through one or more computing system implemented financial management systems, such as computing system implemented financial management systems 180 and 190 of FIG. 1, already being implemented by the user.

Various computing system implemented financial management systems are available including: computing system implemented business financial management systems; computing system implemented sales and inventory tracking systems; computing system implemented tax preparation systems; computing system implemented business accounting systems; and computing system implemented medical expense management systems; as well as various other electronic transaction data driven financial management systems. One or more of these computing system implemented financial management systems would often already be implemented by a user of process for lower of cost or market value monitoring and notification 200 and, in some embodiments, process for lower of cost or market value monitoring and notification 200 is a component, function, or module, of a parent computing system implemented financial management system.

Several computing system implemented business financial management systems provide a centralized interface with banks, and other various financial institutions, for electronically tracking financial transactions to allow a user to, for example, balance checkbooks, pay bills, track expenditures, and create and manage sales, payroll, and operating budgets. Some computer implemented business financial management systems allow a user to track the nature of financial transactions, whether the transaction involved using checks, cash, credit cards, or electronic payment, and categorize each transaction as a particular type of income or expense. Many users find this feature extremely helpful for ensuring bills are paid, preparing tax returns, and/or keeping within an operating expense budget.

Computing system implemented sales and inventory tracking systems help users: manage and track inventory; track sales and purchases; manage expenses; and manage operating costs. Often the computing system implemented sales and inventory tracking system is a component or function of a computing system implemented business financial management system.

Computing system implemented business accounting systems help users perform various accounting tasks by providing an accounting system framework and providing various user interfaces that, when provided with various inventory and transaction data, organize and categorize the inventory and transaction data. Computing system implemented business accounting systems are also often a component or function of a computing system implemented business financial management system.

Computing system implemented tax preparation systems help users track tax related transactions, determine their tax liabilities and credits, and prepare tax documents.

In one embodiment, a user implementing any of the computing system implemented financial management systems discussed above, will often already have obtained/entered data representing identification and purchase price of an inventory item using the computing system implemented financial management system. Consequently, in one embodiment, data regarding the identification of an inventory item and the purchase price a user paid for the inventory item, or a plurality of the inventory items, is obtained at OBTAIN INVENTORY ITEM IDENTIFICATION AND PURCHASE PRICE DATA OPERATION 203 by interfacing with, and gathering the data from, any of the computing system implemented financial management systems, as discussed above, whether available at the time of filing or as developed later.

In some embodiments, process for lower of cost or market value monitoring and notification 200 is a stand alone software product capable of independent implementation. In these embodiments, process for lower of cost or market value monitoring and notification 200 gathers data regarding the identification of an inventory item and the purchase price a user paid for the inventory item, or a plurality of the inventory items at OBTAIN INVENTORY ITEM IDENTIFICATION AND PURCHASE PRICE DATA OPERATION 203 by independently interacting with data obtained by any computing system implemented financial management system or data base or data independently supplied to process for lower of cost or market value monitoring and notification 200.

In one embodiment, data regarding the identification of an inventory item and the purchase price a user paid for the inventory item, or a plurality of the inventory items, obtained at OBTAIN INVENTORY ITEM IDENTIFICATION AND PURCHASE PRICE DATA OPERATION 203 includes determining and/or calculating a value of an inventory item that is eventually produced by the user from other inventory items and/or raw materials. In this embodiment, the value of the inventory item is calculated based on the purchase price of the raw materials and/or the calculated value based on various internal costs such as, for example: labor costs; scrap value/cost; waste and waste disposal costs; and/or any other internal costs specific to a given user.

In one embodiment, data regarding the identification of an inventory item and the purchase price a user paid for the inventory item, or a plurality of the inventory items, is obtained at OBTAIN INVENTORY ITEM IDENTIFICATION AND PURCHASE PRICE DATA OPERATION 203 through electronic invoice and/or transaction records generated at the time of purchase of the inventory item and typically kept by the user either using a computing system implemented financial management system or by saving the electronic invoice and/or transaction record by one or more of the various mechanisms for storing data known to those of skill in the art, and/or as discussed below, and/or as developed later.

In one embodiment, data regarding the identification of an inventory item and the purchase price a user paid for the inventory item, or a plurality of the inventory items, is obtained at OBTAIN INVENTORY ITEM IDENTIFICATION AND PURCHASE PRICE DATA OPERATION 203 through barcodes or RFID on the inventory item itself by scanning or receiving the information directly from the inventory item or its packaging as the inventory item is put into inventory and/or warehoused.

In other embodiments, data regarding the identification of an inventory item and the purchase price a user paid for the inventory item, or a plurality of the inventory items, is obtained at OBTAIN INVENTORY ITEM IDENTIFICATION AND PURCHASE PRICE DATA OPERATION 203 by any means, whether known or available at the time of filing or as later developed, for entering data associated with an inventory item into a computing system, computing device, database, server system, web page, or any other data storage and/or data display and/or data manipulation means or mechanism, whether known or available at the time of filing or as later developed.

In one embodiment, the data regarding the identification of an inventory item and the purchase price a user paid for the inventory item, or a plurality of the inventory items, obtained at OBTAIN INVENTORY ITEM IDENTIFICATION AND PURCHASE PRICE DATA OPERATION 203 includes any unique, and/or specific, public data available about the inventory item that helps uniquely identify the inventory item such as, for example: ISBN or library of congress identification numbers for printed materials; Universal Product Code (UPC) identification or any other Universal Commercial Code (UCC) or GS1 identification, for the inventory item; and/or any other industry, and/or community, and/or government, private or public, standard identification data. In one embodiment, this unique, and/or specific, public data available about the inventory item that helps uniquely identify the inventory item is used at OBTAIN INVENTORY ITEM MARKET VALUE DATA OPERATION 207 (discussed below) to identify the inventory item as accurately as possible.

In one embodiment, once data regarding the identification of an inventory item and the purchase price a user paid for the inventory item, or a plurality of the inventory items, is obtained at OBTAIN INVENTORY ITEM IDENTIFICATION AND PURCHASE PRICE DATA OPERATION 203, process flow proceeds to STORE INVENTORY ITEM IDENTIFICATION AND PURCHASE PRICE DATA OPERATION 205.

At STORE INVENTORY ITEM IDENTIFICATION AND PURCHASE PRICE DATA OPERATION 205 the data regarding the identification of an inventory item and the purchase price a user paid for the inventory item, or a plurality of the inventory items, obtained at OBTAIN INVENTORY ITEM IDENTIFICATION AND PURCHASE PRICE DATA OPERATION 203 is stored and/or saved by storing/saving the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in a computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user computing system; a third party data storage institution; the provider of a parent computing system implemented financial management system employing a process for lower of cost or market value monitoring and notification, such as processes 200, 300, 400, and/or 500; the provider of a process for lower of cost or market value monitoring and notification, such as processes 200, 300, 400, and/or 500; any third party service or institution; or any other parties.

Once the data regarding the identification of an inventory item and the purchase price a user paid for the inventory item, or a plurality of the inventory items, obtained at OBTAIN INVENTORY ITEM IDENTIFICATION AND PURCHASE PRICE DATA OPERATION 203 is stored and/or saved at STORE INVENTORY ITEM IDENTIFICATION AND PURCHASE PRICE DATA OPERATION 205, process flow proceeds to OBTAIN INVENTORY ITEM MARKET VALUE DATA OPERATION 207.

At OBTAIN INVENTORY ITEM MARKET VALUE DATA OPERATION 207 data representing the market price for the inventory item is obtained.

In one embodiment, the data representing the market value for the inventory item is obtained at OBTAIN INVENTORY ITEM MARKET VALUE DATA OPERATION 207 by a user or provider of process for lower of cost or market value monitoring and notification 200 by linking or associating one or more "Watch URLs" associated with publicly accessible web pages where the inventory item is sold and/or a market value is listed. In one embodiment, the watch URLs can include "etailer" web sites such as: Amazon.com®; eBay®; or specific merchant web sites. In one embodiment the watch URLs can include price comparison web sites such as: Shopper.com®; Nextag®; Pricegrabber®; Pricewatch®. In one embodiment the watch URLs can include other web-based sources such as: Froogle; GoogleBase; various classified advertisements; industry specific sources such as Kelly bluebook, NADA, Numismatic Catalogs, Price lists for coins, antiques etc.; financial market data such as commodities listings or market reports, or any other web-based listing or source of a current price for the inventory item, or otherwise indicating the market value of the inventory item. In one embodiment, the market value, or market price, of the inventory item is scraped from one or more of the web sites associated with the watch URLs by methods well known to those of skill in the art such as any screen scraping technology including Really Simple Syndication (RSS) feeds or custom API's. In one embodiment, were multiple URLs are designated watch URLs, an average of the scraped sale prices or market prices is used to determine the current market value of the inventory item.

As noted above, in one embodiment, the data regarding the identification of an inventory item and the purchase price a user paid for the inventory item, or a plurality of the inventory items, obtained at OBTAIN INVENTORY ITEM IDENTIFICATION AND PURCHASE PRICE DATA OPERATION 203 includes unique, and/or specific, public data available about the inventory item that helps uniquely identify the inventory item such as, for example: ISBN or library of congress identification numbers for printed materials; Universal Product Code (UPC) identification or any other Universal Commercial Code (UCC) or GS1 identification, for the inventory item; and/or any other industry, and/or community, and/or government, private or public, standard identification data. As also noted above, in one embodiment, this unique, and/or specific, public data available about the inventory item that helps uniquely identify the inventory item is used at OBTAIN INVENTORY ITEM MARKET VALUE DATA OPERATION 207 to identify the inventory item as accurately as possible and match up the inventory item with similar or identical items listed in the watch URLs.

In one embodiment, linking to web pages/sites associated with the watch URLs is accomplished via communication between one or more computing systems such as computing systems 100 and 150 of FIG. 1 using a network such as network 130 that can be any network or network system that is of interest to a user such as a Local Area Network (LAN), a Wide Area Network (WAN), a public network, such as the Internet, a private network, or other network capable of allowing communication between two or more computing systems. In one embodiment communication is facilitated using analog modems, digital modems, network interface cards, broadband connections, or any other means for communicably coupling computing systems known at the time of filing or as later developed.

In one embodiment, linking to web pages/sites associated with the watch URLs is accomplished via phone lines, phone signals or any other form of electronic audio/video/text or alert messaging and/or communication known at the time of filing or as later developed.

Methods, structures, and processes for linking URLs to electronic representations of objects, such as an inventory item, are well-known to those of skill in the art. Consequently, a more detailed discussion of methods, structures, and processes for linking URLs, and their associated web pages/sites, to an inventory item is omitted here to avoid detracting from the invention.

In addition, methods, structures, and processes for scraping information from Web pages/sites are well-known to those of skill in the art. Consequently a more detailed discussion of methods, structures, and processes for scraping the sale price and/or the market value of an inventory item from a web site associated with a watch URL are omitted here to avoid detracting from the invention.

In one embodiment, the data representing the market value of the inventory item is obtained at OBTAIN INVENTORY ITEM MARKET VALUE DATA OPERATION 207 by subscribing, or otherwise linking, to a market value database (not shown) listing the market value or recent sale prices for the inventory item. In one embodiment, the market value database is a data base such as database 170 of FIG. 1. In one embodiment, the market value database is a designated server system or computing system, or a designated portion of a server system or computing system, such as computing systems 100, 150 and 120. In one embodiment, the market value database is a dedicated mass storage device implemented in software, hardware, or a combination of hardware and software. In one embodiment, the market value database is a web-based function. In one embodiment, the market value database is provided/maintained by the provider of a parent computing system implemented financial management system, such as computing system implemented financial management systems 180 and 190 of FIG. 1, employing a process for lower of cost or market value monitoring and notification, such as processes 200, 300, 400, and/or 500; the provider of a process for lower of cost or market value monitoring and notification, such as processes 200, 300, 400, and/or 500; or third-party institution, for the purpose of providing the market value of various items to subscribers.

In one embodiment, linking to a market value database is accomplished via communication between one or more computing systems such as computing systems 100 and 150 of FIG. 1 using a network such as network 130 that can be any network or network system that is of interest to a user such as a Local Area Network (LAN), a Wide Area Network (WAN), a public network, such as the Internet, a private network, or other network capable of allowing communication between two or more computing systems. In one embodiment communication is facilitated using analog modems, digital modems, network interface cards, broadband connections, or any other means for communicably coupling computing systems known at the time of filing or as later developed.

In one embodiment, linking to a market value database is accomplished via phone lines, phone signals or any other form of electronic audio/video/text or alert messaging and/or communication known at the time of filing or as later developed.

Returning to FIG. 2A, in other embodiments, the data representing the market value for the inventory item is obtained at OBTAIN INVENTORY ITEM MARKET VALUE DATA OPERATION 207 by any other means of gathering an actual or estimated market value for an inventory item, whether available or known at the time of filing or as developed later, including by parsing various web page contents to get the sale price of the inventory item.

In one embodiment, the market value for the inventory item is monitored at OBTAIN INVENTORY ITEM MARKET VALUE DATA OPERATION 207 on a periodic basis, as defined by the user or the provider of process for lower of cost or market value monitoring and notification 200. In one embodiment, the period between instances where the market value for the inventory item is obtained at OBTAIN INVENTORY ITEM MARKET VALUE DATA OPERATION 207 is alternatively, a matter of seconds, minutes, hours, days, weeks, or even months or more, as desired by the user. In one embodiment, the period between instances where the market value for the inventory item is obtained at OBTAIN INVENTORY ITEM MARKET VALUE DATA OPERATION 207 is based on business specific financial considerations such as, financial quarters, mid-years, financial year end, stock statements, shareholder's meetings etc. In one embodiment, the period between instances where the market value for the inventory item is obtained at OBTAIN INVENTORY ITEM MARKET VALUE DATA OPERATION 207 is based on tax quarters and/or tax years, or any other tax driven deadlines or benchmarks particular to a given business or user. Consequently, according to the user's need, the market value of the inventory item can be monitored almost continuously, or as infrequently as desired.

In one embodiment, once the data representing the market value for the inventory item is obtained at OBTAIN INVENTORY ITEM MARKET VALUE DATA OPERATION 207, process flow proceeds to COMPARE INVENTORY ITEM PURCHASE PRICE DATA WITH INVENTORY ITEM MARKET VALUE DATA OPERATION 209.

In one embodiment, at COMPARE INVENTORY ITEM PURCHASE PRICE DATA WITH INVENTORY ITEM MARKET VALUE DATA OPERATION 209 the purchase price of the inventory item data from OBTAIN INVENTORY ITEM IDENTIFICATION AND PURCHASE PRICE DATA OPERATION 203 is compared with the market value from OBTAIN INVENTORY ITEM MARKET VALUE DATA OPERATION 207 using any one of the numerous comparison mechanisms, either implemented in software or hardware, known to those of skill in the art, either at the time of filing or as later developed.

Numerous methods, structures, and processes for comparing data from two different sources are well-known to those of skill in the art. Consequently, a more detailed discussion of methods, structures, and/or processes for comparing inventory purchase price data and the market value data are omitted here to avoid detracting from the invention.

In one embodiment, once the purchase price of the inventory item data from OBTAIN INVENTORY ITEM IDENTIFICATION AND PURCHASE PRICE DATA OPERATION 203 is compared with the market value from OBTAIN INVENTORY ITEM MARKET VALUE DATA OPERATION 207 at COMPARE INVENTORY ITEM PURCHASE PRICE DATA WITH INVENTORY ITEM MARKET VALUE DATA OPERATION 209, process flow proceeds to INVENTORY ITEM MARKET VALUE LESS THAN INVENTORY ITEM PURCHASE PRICE? OPERATION 211.

At INVENTORY ITEM MARKET VALUE LESS THAN INVENTORY ITEM PURCHASE PRICE? OPERATION 211 a determination is made as to whether the market value of the inventory item is less than the inventory item purchase price. If it is determined at INVENTORY ITEM MARKET VALUE LESS THAN INVENTORY ITEM PURCHASE PRICE? OPERATION 211 that the market value of the inventory item is not less than the inventory item purchase price, i.e., a "no: result is obtained, no action is taken and process for lower of cost or market value monitoring and notification 200 returns to OBTAIN INVENTORY ITEM MARKET VALUE DATA OPERATION 207 to await the next monitoring cycle.

On the other hand, if it is determined at INVENTORY ITEM MARKET VALUE LESS THAN INVENTORY ITEM PURCHASE PRICE? OPERATION 211 that the market value of the inventory item is less than the inventory item purchase price, i.e., a "yes" result is obtained, process flow proceeds to ALERT USER/THIRD PARTY OPERATION 213.

In one embodiment, at ALERT USER/THIRD PARTY OPERATION 213 an alert is generated and distributed to the user and/or a third-party designated by the user, such as the user's accountant, indicating that the purchase price of the inventory item is now greater than the estimated market value of the inventory item and therefore there may be business valuation and/or tax ramifications of which the user should be aware.

In one embodiment, the alert generated at ALERT USER/THIRD PARTY OPERATION 213 is accomplished via communication between one or more computing systems such as computing systems 100 and 150 of FIG. 1 using a network such as network 130 that can be any network or network system that is of interest to a user such as a Local Area Network (LAN), a Wide Area Network (WAN), a public network, such as the Internet, a private network, or other network capable of allowing communication between two or more computing systems. In one embodiment, communication is facilitated using analog modems, digital modems, network interface cards, broadband connections, or any other means for communicably coupling computing systems, whether known at the time of filing or as later developed.

Returning to FIG. 2A, in one embodiment, the alert is generated at ALERT USER/THIRD PARTY OPERATION 213 and distributed via phone lines, phone signals or any other form of electronic audio/video/text or alert messaging and/or communication known at the time of filing or as later developed.

In one embodiment, the alert generated at ALERT USER/THIRD PARTY OPERATION 213 is in the form of a pop-up display shown on a display device such as display devices 115, 165, 125 of FIG. 1. FIG. 2B shows a representation of a display screen 231 on display device 230, such as display devices 115 and 165 of FIG. 1, including an alert display 240 (FIG. 2B) activated at ALERT USER/THIRD PARTY OPERATION 213 (FIG. 2B) notifying the user that the market value of the inventory item is less than the inventory item purchase price and the potential consequences of the detected change.

As seen in FIG. 2B, alert display 240 includes alert text 241 indicating, in this specific example, that the market price of the user's "Inventory Item A" has dropped to $1.00 per unit and this is $0.50 less than the "Inventory Item A" purchase price of $1.50 per unit. In this particular example, alert display 240 also shows that the user has 1000 units of "Inventory Item A" and therefore an overall change of $500.00 in "Inventory Item A" has taken place. In addition, in this particular example, alert display 240 indicates that this change in the market value of the "Inventory Item A" may affect the user's tax basis and/or business valuation.

Those of skill in the art will readily recognize that the one example of an alert shown in FIG. 2B is exemplary only and that the information displayed, and the arrangement of the information displayed, in alert display 240 will vary significantly from process to process and user to user. For instance, in one embodiment, alert display 240 can include text indicating how the market value used to trigger the alert was determined. In other embodiments, alert display 240 can include any information desired.

In one embodiment, alert screen 240 generated at ALERT USER/THIRD PARTY OPERATION 213 (FIG. 2A) requires a positive action/acknowledgement such as check box 243 (FIG. 2B) from the user, or third party, before alert screen 240 can be closed or otherwise terminated.

Returning to FIG. 2A, in one embodiment, once an alert is generated and distributed to the user, and/or a third-party designated by the user, at ALERT USER/THIRD PARTY OPERATION 213, process flow proceeds to END OPERATION 217 and process for lower of cost or market value monitoring and notification 200 returns to OBTAIN INVENTORY ITEM MARKET VALUE DATA OPERATION 207 to await the next monitoring cycle.

Using process for lower of cost or market value monitoring and notification 200, a user, such as a small-business owner, can automatically monitor the market value of the business's inventory and compare the market value of the inventory with the price paid for the inventory without devoting significant time or resources to the process. Consequently, using process for lower of cost or market value monitoring and notification 200, the potential business and tax benefits of monitoring the market value of inventory items can be enjoyed without devoting significant amounts time, or the expense of paying a third party or hiring a dedicated employee, to monitor the market value of inventory items.

In one embodiment, in addition to alerting the user, and/or the third-party, of the drop in market value of the inventory item, the information regarding the differential between the market value of the inventory item and the purchase price of the inventory item, i.e., the lower of cost or market value (LCM) adjustment data, is sent directly to a computing system implemented financial management system, such as a computing system implemented business financial management system or a computing system implemented tax preparation system, for further application and/or processing of the data.

Figure 3:
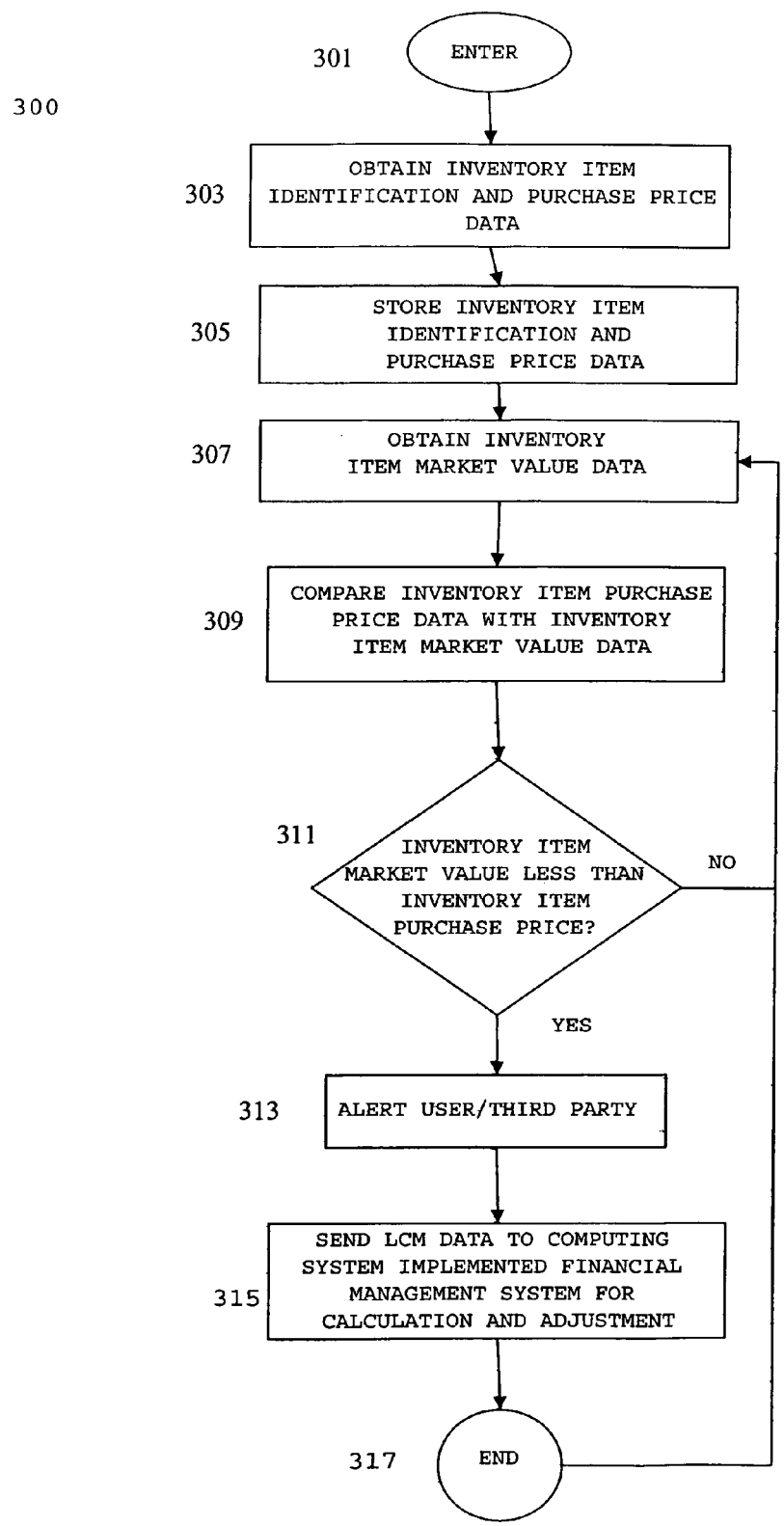
FIG. 3 is a flow chart depicting a process for lower of cost or market value monitoring and notification in accordance with one embodiment.

FIG. 3 is a flow chart depicting a process for lower of cost or market value monitoring and notification 300 in accordance with one embodiment including SEND LCM DATA TO COMPUTING SYSTEM IMPLEMENTED FINANCIAL MANAGEMENT SYSTEM FOR CALCULATION AND ADJUSTMENT OPERATION 315. Process for lower of cost or market value monitoring and notification 300 begins at ENTER OPERATION 301 and process flow proceeds to OBTAIN INVENTORY ITEM IDENTIFICATION AND PURCHASE PRICE DATA OPERATION 303.

OBTAIN INVENTORY ITEM IDENTIFICATION AND PURCHASE PRICE DATA OPERATION 303; STORE INVENTORY ITEM IDENTIFICATION AND PURCHASE PRICE DATA OPERATION 305; OBTAIN INVENTORY ITEM MARKET VALUE DATA OPERATION 307; COMPARE INVENTORY ITEM PURCHASE PRICE DATA WITH INVENTORY ITEM MARKET VALUE DATA OPERATION 309; INVENTORY ITEM MARKET VALUE LESS THAN INVENTORY ITEM PURCHASE PRICE? OPERATION 311; ALERT USER/THIRD PARTY OPERATION 313 of process for lower of cost or market value monitoring and notification 300 of FIG. 3 are substantially identical to OBTAIN INVENTORY ITEM IDENTIFICATION AND PURCHASE PRICE DATA OPERATION 203; STORE INVENTORY ITEM IDENTIFICATION AND PURCHASE PRICE DATA OPERATION 205; OBTAIN INVENTORY ITEM MARKET VALUE DATA OPERATION 207; COMPARE INVENTORY ITEM PURCHASE PRICE DATA WITH INVENTORY ITEM MARKET VALUE DATA OPERATION 209; INVENTORY ITEM MARKET VALUE LESS THAN INVENTORY ITEM PURCHASE PRICE? OPERATION 211; and ALERT USER/THIRD PARTY OPERATION 213 of process for lower of cost or market value monitoring and notification 200 of FIG. 2A. Consequently, the discussion and description of OBTAIN INVENTORY ITEM IDENTIFICATION AND PURCHASE PRICE DATA OPERATION 203; STORE INVENTORY ITEM IDENTIFICATION AND PURCHASE PRICE DATA OPERATION 205; OBTAIN INVENTORY ITEM MARKET VALUE DATA OPERATION 207; COMPARE INVENTORY ITEM PURCHASE PRICE DATA WITH INVENTORY ITEM MARKET VALUE DATA OPERATION 209; INVENTORY ITEM MARKET VALUE LESS THAN INVENTORY ITEM PURCHASE PRICE? OPERATION 211; and ALERT USER/THIRD PARTY OPERATION 213 of process for lower of cost or market value monitoring and notification 200 of FIG. 2A is applicable to, and incorporated herein for, similarly labeled and named elements such as: OBTAIN INVENTORY ITEM IDENTIFICATION AND PURCHASE PRICE DATA OPERATION 303; STORE INVENTORY ITEM IDENTIFICATION AND PURCHASE PRICE DATA OPERATION 305; OBTAIN INVENTORY ITEM MARKET VALUE DATA OPERATION 307; COMPARE INVENTORY ITEM PURCHASE PRICE DATA WITH INVENTORY ITEM MARKET VALUE DATA OPERATION 309; INVENTORY ITEM MARKET VALUE LESS THAN INVENTORY ITEM PURCHASE PRICE? OPERATION 311; ALERT USER/THIRD PARTY OPERATION 313 of process for lower of cost or market value monitoring and notification 300 of FIG. 3.

In one embodiment, once an alert is generated and distributed to the user, and/or a third-party designated by the user, at ALERT USER/THIRD PARTY OPERATION 313 of process for lower of cost or market value monitoring and notification 300 of FIG. 3, process flow proceeds to SEND LCM DATA TO COMPUTING SYSTEM IMPLEMENTED FINANCIAL MANAGEMENT SYSTEM FOR CALCULATION AND ADJUSTMENT OPERATION 315.

In one embodiment, at SEND LCM DATA TO COMPUTING SYSTEM IMPLEMENTED FINANCIAL MANAGEMENT SYSTEM FOR CALCULATION AND ADJUSTMENT OPERATION 315 information obtained at COMPARE INVENTORY ITEM PURCHASE PRICE DATA WITH INVENTORY ITEM MARKET VALUE DATA OPERATION 309 and INVENTORY ITEM MARKET VALUE LESS THAN INVENTORY ITEM PURCHASE PRICE? OPERATION 311 including, in one embodiment, the monetary adjustment of the inventory value data, i.e., the LCM adjustment data, such as would be included in the alert generated at ALERT USER/THIRD PARTY OPERATION 313, as discussed above with respect to FIG. 2C, is automatically forwarded to a computing system implemented financial management system, such as computing system implemented financial management systems 180 and 190 of FIG. 1. In one embodiment, the LCM adjustment data is processed by the computing system implemented financial management system to update various accounts and entries created and maintained by the computing system implemented financial management system.

For instance, in one embodiment the computing system implemented financial management system of SEND LCM DATA TO COMPUTING SYSTEM IMPLEMENTED FINANCIAL MANAGEMENT SYSTEM FOR CALCULATION AND ADJUSTMENT OPERATION 315 is a computing system implemented business financial management system and the computing system implemented business financial management system uses the LCM adjustment data to make adjustments to the appropriate accounts such as an Inventory Asset Account or a COGS-LCM expense account.

In one embodiment, the LCM adjustment data is forwarded to a computing system implemented tax preparation system, either from the computing system implemented business financial management system or directly from process for lower of cost or market value monitoring and notification 300, to directly calculate and realize the tax benefits of the LCM adjustment.

In one embodiment, the LCM adjustment data is sent to a computing system implemented sales and inventory tracking system and/or a computing system implemented business financial management system to take further action such as adjusting the sale price of the inventory item to make it more competitive in light of the new known market value of the inventory item.

In other embodiments, the LCM adjustment data is forwarded to one or more various computing system implemented financial management systems, such as those discussed above, or other computing system implemented financial management systems, whether known at the time of filing or as later developed, for further use and processing of the data, at SEND LCM DATA TO COMPUTING SYSTEM IMPLEMENTED FINANCIAL MANAGEMENT SYSTEM FOR CALCULATION AND ADJUSTMENT OPERATION 315.

In one embodiment, once the LCM adjustment data is forwarded to one or more various computing system implemented financial management systems at SEND LCM DATA TO COMPUTING SYSTEM IMPLEMENTED FINANCIAL MANAGEMENT SYSTEM FOR CALCULATION AND ADJUSTMENT OPERATION 315, process flow proceeds to END OPERATION 317 and process for lower of cost or market value monitoring and notification 300 returns to OBTAIN INVENTORY ITEM MARKET VALUE DATA OPERATION 307 to await the next monitoring cycle.

In one embodiment, the user is provided the opportunity to define a threshold differential value between the purchase price of an inventory item and the market value of the inventory item whereby, only when the market value of the inventory item drops below the purchase price of the inventory item by the defined threshold value does the process for lower of cost or market value monitoring and notification alert the user.

Figure 4:
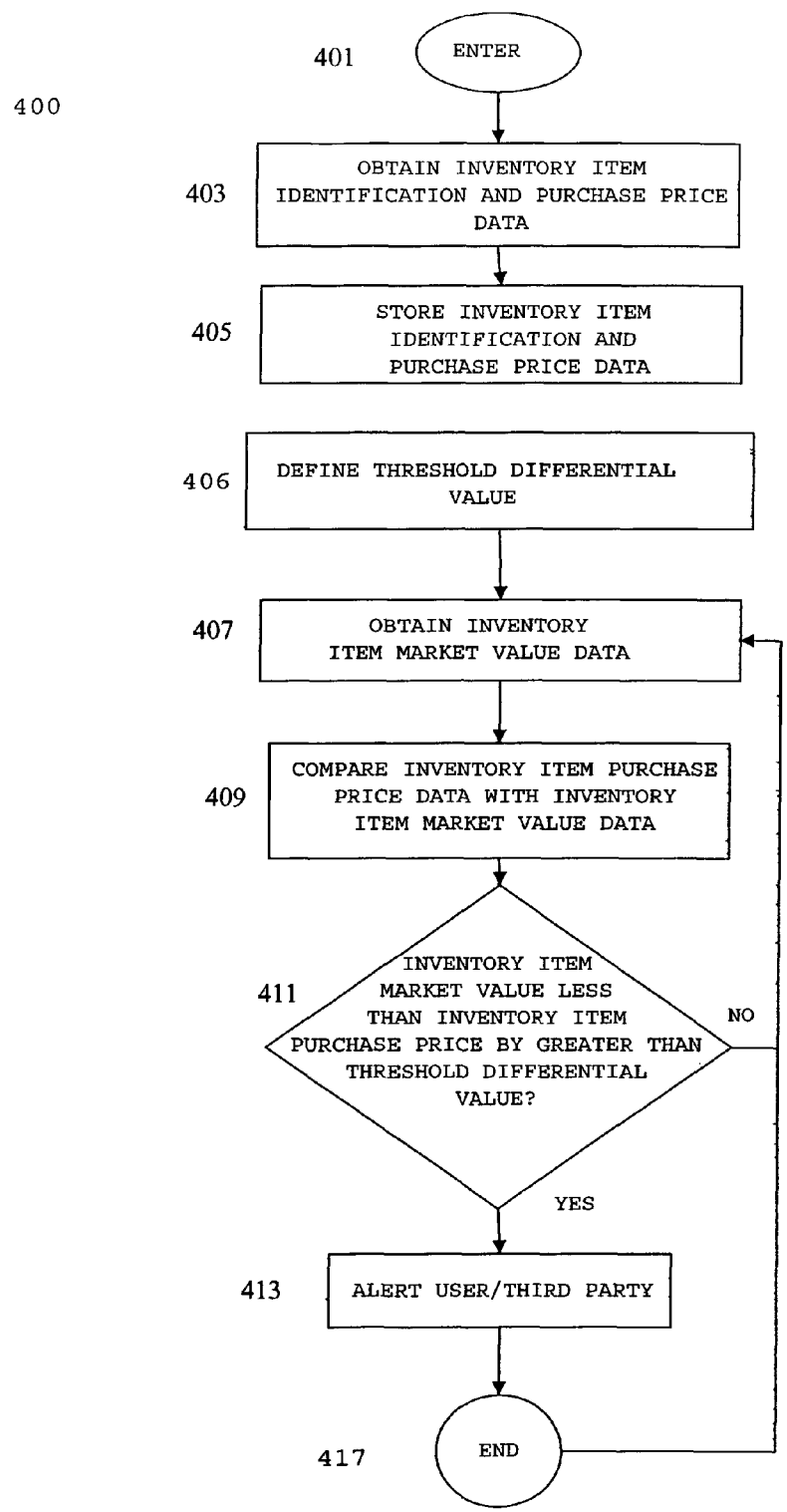
FIG. 4 is a flow chart depicting a process for lower of cost or market value monitoring and notification in accordance with one embodiment.

FIG. 4 is a flow chart depicting a process for lower of cost or market value monitoring and notification 400 in accordance with one embodiment including DEFINE THRESHOLD DIFFERENTIAL VALUE OPERATION 406. Process for lower of cost or market value monitoring and notification 400 begins at ENTER OPERATION 401 and process flow proceeds to OBTAIN INVENTORY ITEM IDENTIFICATION AND PURCHASE PRICE DATA OPERATION 403.

At OBTAIN INVENTORY ITEM IDENTIFICATION AND PURCHASE PRICE DATA OPERATION 403, data regarding the identification of an inventory item and the purchase price a user paid for the inventory item, or a plurality of the inventory items, is obtained by any one of the methods discussed above with respect to OBTAIN INVENTORY ITEM IDENTIFICATION AND PURCHASE PRICE DATA OPERATION 203 of FIG. 2A, and/or known to those of skill in the art at the time of filing or as developed later.

Returning to FIG. 4, in one embodiment, once data regarding the identification of an inventory item and the purchase price a user paid for the inventory item, or a plurality of the inventory items, is obtained at OBTAIN INVENTORY ITEM IDENTIFICATION AND PURCHASE PRICE DATA OPERATION 403, process flow proceeds to STORE INVENTORY ITEM IDENTIFICATION AND PURCHASE PRICE DATA OPERATION 405.

At STORE INVENTORY ITEM IDENTIFICATION AND PURCHASE PRICE DATA OPERATION 405 data regarding the identification of the inventory item and the purchase price a user paid for the inventory item, or a plurality of the inventory items, obtained at OBTAIN INVENTORY ITEM IDENTIFICATION AND PURCHASE PRICE DATA OPERATION 403 is stored and/or saved by storing/saving the data, in whole, or in part, by any one of the numerous mechanisms known to those of skill in the art and/or as discussed above with respect to STORE INVENTORY ITEM IDENTIFICATION AND PURCHASE PRICE DATA OPERATION 205 of FIG. 2A.

Returning to FIG. 4, once the data regarding the identification of an inventory item and the purchase price a user paid for the inventory item, or a plurality of the inventory items, obtained at OBTAIN INVENTORY ITEM IDENTIFICATION AND PURCHASE PRICE DATA OPERATION 403 is stored and/or saved at STORE INVENTORY ITEM IDENTIFICATION AND PURCHASE PRICE DATA OPERATION 405, process flow proceeds to DEFINE THRESHOLD DIFFERENTIAL VALUE OPERATION 406.

At DEFINE THRESHOLD DIFFERENTIAL VALUE OPERATION 406 the user is provided the opportunity to define a threshold differential value, or price, between the purchase price of the inventory item from OBTAIN INVENTORY ITEM IDENTIFICATION AND PURCHASE PRICE DATA OPERATION 403 and a market value of the inventory item as is obtained at OBTAIN INVENTORY ITEM MARKET VALUE DATA OPERATION 407, discussed below. As also discussed below, in one embodiment the threshold differential value defined at DEFINE THRESHOLD DIFFERENTIAL VALUE OPERATION 406 must be surpassed before any alert/notification of the user is attempted. In this way, the user is provided an opportunity to predefine what level of change in market value is worthy of his or her consideration and time.

In one embodiment, the threshold differential value defined at DEFINE THRESHOLD DIFFERENTIAL VALUE OPERATION 406 is a monetary amount, such as a dollar amount. In one embodiment, the threshold differential value defined at DEFINE THRESHOLD DIFFERENTIAL VALUE OPERATION 406 is a percentage of the purchase price of the inventory item. In other embodiments, any other calculus can be used to determine the threshold differential value defined at DEFINE THRESHOLD DIFFERENTIAL VALUE OPERATION 406.

In one embodiment, once the threshold differential value is defined at DEFINE THRESHOLD DIFFERENTIAL VALUE OPERATION 406, process flow proceeds to OBTAIN INVENTORY ITEM MARKET VALUE DATA OPERATION 407.

At OBTAIN INVENTORY ITEM MARKET VALUE DATA OPERATION 407 data representing the market price/value for the inventory item is obtained.

In one embodiment, the data representing the market value for the inventory item is obtained at OBTAIN INVENTORY ITEM MARKET VALUE DATA OPERATION 407 by any of the methods discussed above with respect to OBTAIN INVENTORY ITEM MARKET VALUE DATA OPERATION 207 of FIG. 2A.

Returning to FIG. 4, in one embodiment, once the data representing the market value for the inventory item is obtained at OBTAIN INVENTORY ITEM MARKET VALUE DATA OPERATION 407, process flow proceeds to COMPARE INVENTORY ITEM PURCHASE PRICE DATA WITH INVENTORY ITEM MARKET VALUE DATA OPERATION 409.

In one embodiment, at COMPARE INVENTORY ITEM PURCHASE PRICE DATA WITH INVENTORY ITEM MARKET VALUE DATA OPERATION 409 the purchase price of the inventory item data from OBTAIN INVENTORY ITEM IDENTIFICATION AND PURCHASE PRICE DATA OPERATION 403, and stored at STORE INVENTORY ITEM IDENTIFICATION AND PURCHASE PRICE DATA OPERATION 405, is compared with the market value from OBTAIN INVENTORY ITEM MARKET VALUE DATA OPERATION 407 using any one of the numerous comparison mechanisms, either implemented in software or hardware, known to those of skill in the art either at the time of filing or as later developed and/or as discussed above with respect to COMPARE INVENTORY ITEM PURCHASE PRICE DATA WITH INVENTORY ITEM MARKET VALUE DATA OPERATION 209 of FIG. 2A.

Returning to FIG. 4 in one embodiment, once the purchase price of the inventory item data from OBTAIN INVENTORY ITEM IDENTIFICATION AND PURCHASE PRICE DATA OPERATION 403 is compared with the market value from OBTAIN INVENTORY ITEM MARKET VALUE DATA OPERATION 407 at COMPARE INVENTORY ITEM PURCHASE PRICE DATA WITH INVENTORY ITEM MARKET VALUE DATA OPERATION 409, process flow proceeds to INVENTORY ITEM MARKET VALUE LESS THAN INVENTORY ITEM PURCHASE PRICE BY GREATER THAN THRESHOLD DIFFERENTIAL VALUE? OPERATION 411.

At INVENTORY ITEM MARKET VALUE LESS THAN INVENTORY ITEM PURCHASE PRICE BY GREATER THAN THRESHOLD DIFFERENTIAL VALUE? OPERATION 411 a determination is made as to whether the market value of the inventory item is less than the inventory item purchase price and, less than the inventory item purchase price by an amount equal to, or greater than, the threshold differential value defined at DEFINE THRESHOLD DIFFERENTIAL VALUE OPERATION 406. If it is determined at INVENTORY ITEM MARKET VALUE LESS THAN INVENTORY ITEM PURCHASE PRICE BY GREATER THAN THRESHOLD DIFFERENTIAL VALUE? OPERATION 411 that the market value of the inventory item is not less than the inventory item purchase price by an amount equal to, or greater than, the threshold differential value defined at DEFINE THRESHOLD DIFFERENTIAL VALUE OPERATION 406, i.e., a "no: result is obtained, no action is taken and process for lower of cost or market value monitoring and notification 400 returns to OBTAIN INVENTORY ITEM MARKET VALUE DATA OPERATION 407 to await the next monitoring cycle.

On the other hand, if it is determined at INVENTORY ITEM MARKET VALUE LESS THAN INVENTORY ITEM PURCHASE PRICE BY GREATER THAN THRESHOLD DIFFERENTIAL VALUE? OPERATION 411 that the market value of the inventory item is less than the inventory item purchase price by an amount equal to, or greater than, the threshold differential value defined at DEFINE THRESHOLD DIFFERENTIAL VALUE OPERATION 406, i.e., a "yes" result is obtained, process flow proceeds to ALERT USER/THIRD PARTY OPERATION 413.

In one embodiment, at ALERT USER/THIRD PARTY OPERATION 413 an alert is generated and distributed to the user and/or a third-party designated by the user, such as the user's accountant, indicating that the purchase price of the inventory item is now greater than the estimated market value of the inventory item by at least the threshold amount and therefore there may be business valuation and/or tax ramifications the of which the user should be aware.

In one embodiment, the alert generated at ALERT USER/THIRD PARTY OPERATION 413 is accomplished via any of the methods and means discussed above with respect to ALERT USER/THIRD PARTY OPERATION 213 of FIG. 2A.

Returning to FIG. 4, in one embodiment, once an alert is generated and distributed to the user, and/or a third-party designated by the user, at ALERT USER/THIRD PARTY OPERATION 413, process flow proceeds to END OPERATION 417 and process for lower of cost or market value monitoring and notification 400 returns to OBTAIN INVENTORY ITEM MARKET VALUE DATA OPERATION 407 to await the next monitoring cycle.

In one embodiment, in addition to alerting the user, and/or the third-party, of the drop in market value of the inventory item below the user defined differential threshold, the information regarding the differential between the market value of the inventory item and the purchase price of the inventory item, i.e., the lower of cost or market value (LCM) adjustment data, is sent directly to a computing system implemented financial management system, such as a computing system implemented business financial management system or a computing system implemented tax preparation system, for further application and/or processing of the data.

Figure 5:
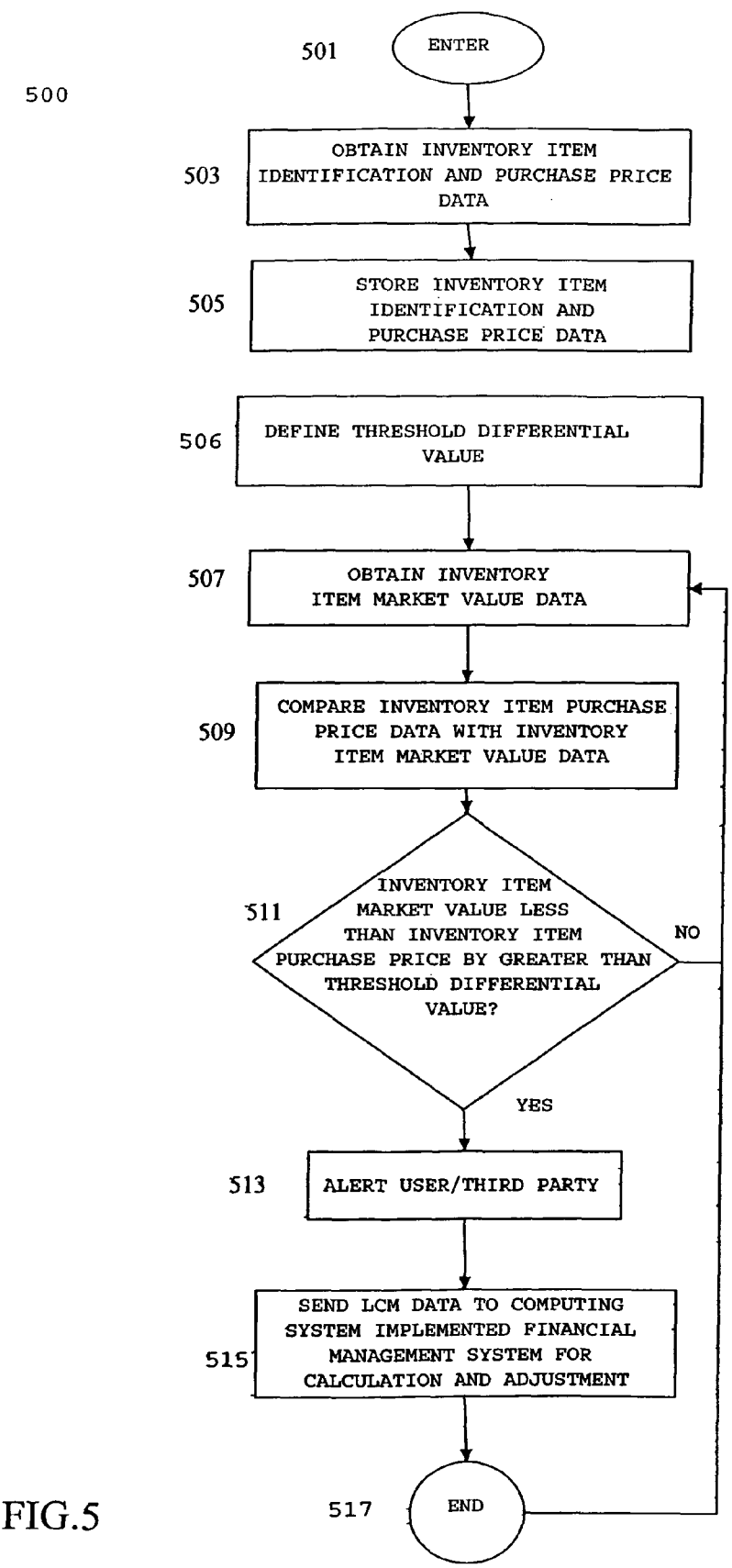
FIG. 5 is a flow chart depicting a process for lower of cost or market value monitoring and notification in accordance with one embodiment.

FIG. 5 is a flow chart depicting a process for lower of cost or market value monitoring and notification 500 in accordance with one embodiment including DEFINE THRESHOLD DIFFERENTIAL VALUE OPERATION 506 and SEND LCM DATA TO COMPUTING SYSTEM IMPLEMENTED FINANCIAL MANAGEMENT SYSTEM FOR CALCULATION AND ADJUSTMENT OPERATION 515.

Process for lower of cost or market value monitoring and notification 500 begins at ENTER OPERATION 501 and process flow proceeds to OBTAIN INVENTORY ITEM IDENTIFICATION AND PURCHASE PRICE DATA OPERATION 503.

At OBTAIN INVENTORY ITEM IDENTIFICATION AND PURCHASE PRICE DATA OPERATION 503, data regarding the identification of an inventory item and the purchase price a user paid for the inventory item, or a plurality of the inventory items, is obtained by any one of several methods discussed above with respect to OBTAIN INVENTORY ITEM IDENTIFICATION AND PURCHASE PRICE DATA OPERATION 203 of FIG. 2A, and/or known to those of skill in the art at the time of filing or as developed later.

Returning to FIG. 5, in one embodiment, once data regarding the identification of an inventory item and the purchase price a user paid for the inventory item, or a plurality of the inventory items, is obtained at OBTAIN INVENTORY ITEM IDENTIFICATION AND PURCHASE PRICE DATA OPERATION 503, process flow proceeds to STORE INVENTORY ITEM IDENTIFICATION AND PURCHASE PRICE DATA OPERATION 505.

At STORE INVENTORY ITEM IDENTIFICATION AND PURCHASE PRICE DATA OPERATION 505 data regarding the identification of the inventory item and the purchase price the user paid for the inventory item, or a plurality of the inventory items, obtained at OBTAIN INVENTORY ITEM IDENTIFICATION AND PURCHASE PRICE DATA OPERATION 503 is stored and/or saved by storing/saving the data, in whole, or in part, by any one of the numerous mechanisms known to those of skill in the art and/or as discussed above with respect to STORE INVENTORY ITEM IDENTIFICATION AND PURCHASE PRICE DATA OPERATION 205 of FIG. 2A.

Returning to FIG. 5, once the data regarding the identification of the inventory item and the purchase price the user paid for the inventory item, or a plurality of the inventory items, obtained at OBTAIN INVENTORY ITEM IDENTIFICATION AND PURCHASE PRICE DATA OPERATION 503 is stored and/or saved at STORE INVENTORY ITEM IDENTIFICATION AND PURCHASE PRICE DATA OPERATION 505, process flow proceeds to DEFINE THRESHOLD DIFFERENTIAL VALUE OPERATION 506.

At DEFINE THRESHOLD DIFFERENTIAL VALUE OPERATION 506 the user is provided the opportunity to define a threshold differential value, or price, between the purchase price of the inventory item from OBTAIN INVENTORY ITEM IDENTIFICATION AND PURCHASE PRICE DATA OPERATION 503 and a market value of the inventory item as is obtained at OBTAIN INVENTORY ITEM MARKET VALUE DATA OPERATION 507, discussed below. As also discussed below, in one embodiment the threshold differential value defined at DEFINE THRESHOLD DIFFERENTIAL VALUE OPERATION 506 must be surpassed before any alert/notification of the user is attempted. In this way, the user is provided an opportunity to predefine what level of change in market value is worthy of his or her consideration and time.

In one embodiment, the threshold differential value defined at DEFINE THRESHOLD DIFFERENTIAL VALUE OPERATION 506 is a monetary amount, such as a dollar amount. In one embodiment, the threshold differential value defined at DEFINE THRESHOLD DIFFERENTIAL VALUE OPERATION 506 is a percentage of the purchase price of the inventory item. In other embodiments, any other calculus can be used to determine the threshold differential value defined at DEFINE THRESHOLD DIFFERENTIAL VALUE OPERATION 506.

In one embodiment, once the threshold differential value is defined at DEFINE THRESHOLD DIFFERENTIAL VALUE OPERATION 506, process flow proceeds to OBTAIN INVENTORY ITEM MARKET VALUE DATA OPERATION 507.

At OBTAIN INVENTORY ITEM MARKET VALUE DATA OPERATION 507 data representing the market value for the inventory item is obtained. In one embodiment, the data representing the market value for the inventory item is obtained at OBTAIN INVENTORY ITEM MARKET VALUE DATA OPERATION 507 by any of the method discussed above with respect to OBTAIN INVENTORY ITEM MARKET VALUE DATA OPERATION 207 of FIG. 2A.

Returning to FIG. 5, in one embodiment, once the data representing the market value for the inventory item is obtained at OBTAIN INVENTORY ITEM MARKET VALUE DATA OPERATION 507, process flow proceeds to COMPARE INVENTORY ITEM PURCHASE PRICE DATA WITH INVENTORY ITEM MARKET VALUE DATA OPERATION 509.

In one embodiment, at COMPARE INVENTORY ITEM PURCHASE PRICE DATA WITH INVENTORY ITEM MARKET VALUE DATA OPERATION 509 the purchase price of the inventory item data from OBTAIN INVENTORY ITEM IDENTIFICATION AND PURCHASE PRICE DATA OPERATION 503, and stored at STORE INVENTORY ITEM IDENTIFICATION AND PURCHASE PRICE DATA OPERATION 505, is compared with the market value from OBTAIN INVENTORY ITEM MARKET VALUE DATA OPERATION 507 using any one of the numerous comparison mechanisms, either implemented in software or hardware, known to those of skill in the art either at the time of filing or as later developed and/or as discussed above with respect to COMPARE INVENTORY ITEM PURCHASE PRICE DATA WITH INVENTORY ITEM MARKET VALUE DATA OPERATION 209 of FIG. 2A.

Returning to FIG. 5, in one embodiment, once the purchase price of the inventory item data from OBTAIN INVENTORY ITEM IDENTIFICATION AND PURCHASE PRICE DATA OPERATION 503 is compared with the market value from OBTAIN INVENTORY ITEM MARKET VALUE DATA OPERATION 507 at COMPARE INVENTORY ITEM PURCHASE PRICE DATA WITH INVENTORY ITEM MARKET VALUE DATA OPERATION 509, process flow proceeds to INVENTORY ITEM MARKET VALUE LESS THAN INVENTORY ITEM PURCHASE PRICE BY GREATER THAN THRESHOLD DIFFERENTIAL VALUE? OPERATION 511.

At INVENTORY ITEM MARKET VALUE LESS THAN INVENTORY ITEM PURCHASE PRICE BY GREATER THAN THRESHOLD DIFFERENTIAL VALUE? OPERATION 511 a determination is made as to whether the market value of the inventory item is less than the inventory item purchase price and, less than the inventory item purchase by an amount equal to, or greater than, the threshold differential value defined at DEFINE THRESHOLD DIFFERENTIAL VALUE OPERATION 506. If it is determined at INVENTORY ITEM MARKET VALUE LESS THAN INVENTORY ITEM PURCHASE PRICE BY GREATER THAN THRESHOLD DIFFERENTIAL VALUE? OPERATION 511 that the market value of the inventory item is not less than the inventory item purchase price by an amount equal to, or greater than, the threshold differential value defined at DEFINE THRESHOLD DIFFERENTIAL VALUE OPERATION 506, i.e., a "no: result is obtained, no action is taken and process for lower of cost or market value monitoring and notification 500 returns to OBTAIN INVENTORY ITEM MARKET VALUE DATA OPERATION 507 to await the next monitoring cycle.

On the other hand, if it is determined at INVENTORY ITEM MARKET VALUE LESS THAN INVENTORY ITEM PURCHASE PRICE BY GREATER THAN THRESHOLD DIFFERENTIAL VALUE? OPERATION 511 that the market value of the inventory item is less than the inventory item purchase price by an amount equal to, or greater than, the threshold differential value defined at DEFINE THRESHOLD DIFFERENTIAL VALUE OPERATION 506, i.e., a "yes" result is obtained, process flow proceeds to ALERT USER/THIRD PARTY OPERATION 513.

In one embodiment, at ALERT USER/THIRD PARTY OPERATION 513 an alert is generated and distributed to the user and/or a third-party designated by the user, such as the user's accountant, indicating that the purchase price of the inventory item is now greater than the estimated market value of the inventory item by at least the threshold differential value and therefore there may be business valuation and/or tax ramifications of which the user should be aware.

In one embodiment, the alert generated at ALERT USER/THIRD PARTY OPERATION 513 is accomplished via any of the methods and means discussed above with respect to ALERT USER/THIRD PARTY OPERATION 213 of FIG. 2A.

Returning to FIG. 5, in one embodiment, once an alert is generated and distributed to the user, and/or a third-party designated by the user, at ALERT USER/THIRD PARTY OPERATION 513, process flow proceeds to SEND LCM DATA TO COMPUTING SYSTEM IMPLEMENTED FINANCIAL MANAGEMENT SYSTEM FOR CALCULATION AND ADJUSTMENT OPERATION 515.

In one embodiment, SEND LCM DATA TO COMPUTING SYSTEM IMPLEMENTED FINANCIAL MANAGEMENT SYSTEM FOR CALCULATION AND ADJUSTMENT OPERATION 515 of process for lower of cost or market value monitoring and notification 500 is substantially identical to SEND LCM DATA TO COMPUTING SYSTEM IMPLEMENTED FINANCIAL MANAGEMENT SYSTEM FOR CALCULATION AND ADJUSTMENT OPERATION 315 of process for lower of cost or market value monitoring and notification 300 of FIG. 3. Consequently, the discussion above with respect to SEND LCM DATA TO COMPUTING SYSTEM IMPLEMENTED FINANCIAL MANAGEMENT SYSTEM FOR CALCULATION AND ADJUSTMENT OPERATION 315 of process for lower of cost or market value monitoring and notification 300 of FIG. 3 applies to, and is incorporated here for, SEND LCM DATA TO COMPUTING SYSTEM IMPLEMENTED FINANCIAL MANAGEMENT SYSTEM FOR CALCULATION AND ADJUSTMENT OPERATION 515 of process for lower of cost or market value monitoring and notification 500.

In one embodiment once the LCM adjustment data is forwarded to one or more various computing system implemented financial management systems at SEND LCM DATA TO COMPUTING SYSTEM IMPLEMENTED FINANCIAL MANAGEMENT SYSTEM FOR CALCULATION AND ADJUSTMENT OPERATION 515, process flow proceeds to END OPERATION 517 and process for lower of cost or market value monitoring and notification 500 returns to OBTAIN INVENTORY ITEM MARKET VALUE DATA OPERATION 507 to await the next monitoring cycle.

In some embodiments, some, or all, of the data associated with, created by, processed by, used by, or modified by: process for lower of cost or market value monitoring and notification 200; process for lower of cost or market value monitoring and notification 300; process for lower of cost or market value monitoring and notification 400; and process for lower of cost or market value monitoring and notification 500, is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user, computing system; third party data storage institution; the provider of a parent computing system implemented financial management system employing a process for lower of cost or market value monitoring and notification, such as processes 200, 300, 400, and/or 500; the provider of a process for lower of cost or market value monitoring and notification, such as processes 200, 300, 400, and/or 500; any third party service or institution; or any other parties.

Using the method and apparatus for lower of cost or market value monitoring and the process for lower of cost or market value monitoring and notification disclosed herein, a user, such as a small-business owner, can automatically monitor the market value of the business's inventory and compare the market value of the inventory with the price paid for the inventory without devoting significant time or resources to the process. Consequently, using the method and apparatus for lower of cost or market value monitoring and the process for lower of cost or market value monitoring and notification disclosed herein, the potential business and tax benefits of monitoring the market value of inventory items can be enjoyed without devoting significant amounts of time, or the expense of paying a third party or hiring a dedicated employee, to monitor the market value of inventory items.

In addition, as discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components and/or operations described herein is merely exemplary, and not mandatory or significant. Consequently, functions performed by a single component and/or operation may, in other embodiments, be performed by multiple components and/or operations, and functions performed by multiple components and/or operations may, in other embodiments, be performed by a single component and/or operation.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining" "storing", "linking", "comparing", "sending", "calculating", "multiplying", "defining" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for lower of cost or market value monitoring and notification, discussed herein, are identified using a particular nomenclature for ease of description and understanding, but other nomenclature is often used in the art to identify equivalent operations.

In addition, the order of operations depicted in the FIG.s and discussed above was chosen for merely illustrative purposes. Those of skill in the art will readily recognize that different orders of operations can be implemented without departing from the scope of the invention as claimed below.

Therefore, numerous variations, whether explicitly provided for by the specification or implied by the specification or not, may be implemented by one of skill in the art in view of this disclosure.

What is claimed is:

1. A system for lower of cost or market value monitoring and notification comprising:
   a computing system; and
   a processor for executing a process for lower of cost or market value monitoring and notification, the process for lower of cost or market value monitoring and notification comprising: obtaining an identification and a purchase price of an inventory item, the inventory item being an item purchased at the purchase price by a business and which is now held as inventory;
   periodically obtaining a market value of the inventory item;
   periodically comparing the purchase price of the inventory item with the market value of the inventory item; and
   determining that the market value of the inventory item indicates the market value of the inventory item is less than the purchase price of the inventory item; and
   alerting a user of the process for lower of cost or market value monitoring and notification of change in market value of the inventory item.

2. The system for lower of cost or market value monitoring and notification of claim 1, wherein:
   obtaining an identification and a purchase price of an inventory item is accomplished using a computing system implemented financial management system.

3. The system for lower of cost or market value monitoring and notification of claim 1, wherein:
   periodically obtaining a market value of the inventory item comprises linking one or more Universal Resource Locators (URLs) to the inventory item and periodically obtaining the market value of the inventory item from one or more web sites associated with the one or more URLs.

4. The system for lower of cost or market value monitoring and notification of claim 1, wherein:
   periodically obtaining a market value of the inventory item comprises periodically obtaining the market value data from a database.

5. The system for lower of cost or market value monitoring and notification of claim 1, wherein;
   the process for lower of cost or market value monitoring and notification further comprises:
   determining that the market value of the inventory item indicates the market value of the inventory item is less than the purchase price of the inventory item; and
   determining the differential value between the market value of the inventory item and the purchase price of the inventory item and automatically forwarding the differential value to a computing system implemented financial management system for further use and processing by the computing system implemented financial management system.

6. The system for lower of cost or market value monitoring and notification of claim 5, wherein:

periodically obtaining a market value of the inventory item comprises linking one or more Universal Resource Locators (URLs) to the inventory item and periodically obtaining the market value of the inventory item from one or more web sites associated with the one or more URLs.

7. The system for lower of cost or market value monitoring and notification of claim 5, wherein:
periodically obtaining a market value a the inventory item comprises periodically obtaining the market value data from a database.

8. The system for lower of cost or market value monitoring and notification of claim 5, wherein:
the computing system implemented financial management system is a computing system implemented business financial management system.

9. The system for lower of cost or market value monitoring and notification of claim 5, wherein:
the computing system implemented financial management system is a computing system implemented tax preparation system.

10. A system for lower of cost or market value monitoring and notification comprising: a computing system; and a processor for executing a process for lower of cost or market value monitoring and notification, the process for lower of cost or market value monitoring and notification comprising:
obtaining an identification and a purchase price associated with an inventory item, the inventory item being an item purchased at the purchase price by a business and which is now held as inventory;
periodically obtaining a market value of the inventory item;
defining a threshold differential value between the market value of the inventory item and the purchase price of the inventory item;
periodically comparing the purchase price of the inventory item with the market value of the inventory item; and
determining that the market value of the inventory item indicates the market value of the inventory item is less than the purchase price of the inventory item by an amount greater than, or equal to, the threshold differential value; and
alerting a user of the process for lower of cost or market value monitoring and notification of change in market value of the inventory item.

11. The system for lower of cost or market value monitoring and notification of claim 10, wherein:
periodically obtaining a market value of the inventory item comprises linking one or more Universal Resource Locators (URLs) to the inventory item and periodically obtaining the market value of the inventory item from one or more web sites associated with the one or more URLs.

12. The system for lower of cost or market value monitoring and notification of claim 10, wherein:
periodically obtaining a market value of the inventory item comprises periodically obtaining the market value data from a database.

13. The system for lower of cost or market value monitoring and notification of claim 10, wherein;
the process for lower of cost or market value monitoring and notification further comprises:
determining the differential value between the market value of the inventory item and the purchase price of the inventory item and automatically forwarding the differential value to a computing system implemented financial management system for further use and processing by the computing system implemented financial management system.

14. The system for lower of cost or market value monitoring and notification of claim 13, wherein:
periodically obtaining a market value of the inventory item comprises linking one or more Universal Resource Locators (URLs) to the inventory item and periodically obtaining the market value of the inventory item from one or more web sites associated with the one or more URLs.

15. The system for lower of cost or market value monitoring and notification of claim 13, wherein:
periodically obtaining a market value of the inventory item comprises periodically obtaining the market value data from a database.

16. The system for lower of cost or market value monitoring and notification of claim 13, wherein:
the computing system implemented financial management system is a computing system implemented business financial management system.

17. The system for lower of cost or market value monitoring and notification of claim 13, wherein:
the computing system implemented financial management system is a computing system implemented tax preparation system.

18. A computer program product for lower of cost or market value monitoring and notification comprising:
a non transitory computer readable medium;
and computer program code, encoded on the computer readable medium, comprising computer readable instructions for:
obtaining an identification and a purchase price associated with an inventory item, the inventory item being an item purchased at the purchase price by a business and which is now held as inventory;
periodically obtaining a market value of the inventory item;
periodically comparing the purchase price of the inventory item with the market value of the inventory item; and
determining that the market value of the inventory item indicates the market value of the inventory item is less than the purchase price of the inventory item; and
alerting a user of the process for lower of cost or market value monitoring and notification of change in market value of the inventory item.

19. The computer program product for lower of cost or market value monitoring and notification of claim 18, wherein:
obtaining an identification and a purchase price of an inventory item is accomplished using a computing system implemented financial management system.

20. The computer program product for lower of cost or market value monitoring and notification of claim 18, wherein:
periodically obtaining a market value of the inventory item comprises linking one or more Universal Resource Locators (URLs) to the inventory item and periodically obtaining the market value of the inventory item from one or more web sites associated with the one or more URLs.

21. The computer program product for lower of cost or market value monitoring and notification of claim 18, wherein:
periodically obtaining a market value of the inventory item comprises periodically obtaining the market value data from a database.

22. The computer program product for lower of cost or market value monitoring and notification of claim 18, wherein:
the computer program code, encoded on the computer readable medium, further comprises computer readable instructions for:
determining the differential value between the market value of the inventory item and the purchase price of the inventory item and automatically forwarding the differential value to a computing system implemented financial management system for further use and processing by the computing system implemented financial management system.

23. The computer program product for lower of cost or market value monitoring and notification of claim 22, wherein:
periodically obtaining a market value of the inventory item comprises linking one or more Universal Resource Locators (URLs) to the inventory item and periodically obtaining the market value of the inventory item from one or more web sites associated with the one or more URLs.

24. The computer program product for lower of cost or market value monitoring and notification of claim 22, wherein:
periodically obtaining a market value of the inventory item comprises periodically obtaining the market value data from a database.

25. The computer program product for lower of cost or market value monitoring and notification of claim 22, wherein:
the computing system implemented financial management system is a computing system implemented business financial management system.

26. The computer program product for lower of cost or market value monitoring and notification of claim 22, wherein:
the computing system implemented financial management system is a computing system implemented tax preparation system.

27. A computer program product for lower of cost or market value monitoring and notification comprising:
a non transitory computer readable medium;
and computer program code, encoded on the computer readable medium, comprising computer readable instructions for:
obtaining an identification and a purchase price associated with an inventory item, the inventory item being an item purchased at the purchase price by a business and which is now held as inventory;
periodically obtaining a market value of the inventory item;
defining a threshold differential value between the market value of the inventory item and the purchase price of the inventory item;
periodically comparing the purchase price of the inventory item with the market value of the inventory item; and
determining that the market value of the inventory item is less than the purchase price of the inventory item by an amount greater than, or equal to, the threshold differential value; and
alerting a user of the process for lower of cost or market value monitoring and notification of change in market value of the inventory item.

28. The computer program product for lower of cost or market value monitoring and notification of claim 27, wherein:
periodically obtaining a market value of the inventory item comprises linking one or more Universal Resource Locators (URLs) to the inventory item and periodically obtaining the market value of the inventory item from one or more web sites associated with the one or more URLs.

29. The computer program product for lower of cost or market value monitoring and notification of claim 27, wherein:
periodically obtaining a market value of the inventory item comprises periodically obtaining the market value data from a database.

30. The computer program product for lower of cost or market value monitoring and notification of claim 27, wherein;
the computer program code, encoded on the computer readable medium, further comprises computer readable instructions for:
determining the differential value between the market value of the inventory item and the purchase price of the inventory item and automatically forwarding the differential value to a computing system implemented financial management system for further use and processing by the computing system implemented financial management system.

31. The computer program product for lower of cost or market value monitoring and notification of claim 30, wherein;
periodically obtaining a market value of the inventory item comprises linking one or more Universal Resource Locators (URLs) to the inventory item and periodically obtaining the market value of the inventory item from one or more web sites associated with the one or more URLs.

32. The computer program product for lower of cost or market value monitoring and notification of claim 30, wherein;
periodically obtaining a market value of the inventory item comprises periodically obtaining the market value data from a database.

33. The computer program product for lower of cost or market value monitoring and notification of claim 30, wherein;
the computing system implemented financial management system is a computing system implemented business financial management system.

34. The computer program product for lower of cost or market value monitoring and notification of claim 30, wherein;
the computing system implemented financial management system is a computing system implemented tax preparation system.

* * * * *

UNITED STATES PATENT AND TRADEMARK OFFICE
CERTIFICATE OF CORRECTION

| | | |
|---|---|---|
| PATENT NO. | : 8,108,271 B1 | Page 1 of 2 |
| APPLICATION NO. | : 11/489157 | |
| DATED | : January 31, 2012 | |
| INVENTOR(S) | : David Audley Duncan et al. | |

It is certified that error appears in the above-identified patent and that said Letters Patent is hereby corrected as shown below:

In the drawings:

Replace sheet three, including Fig. 2B, with the attached Replacement Sheet three, including Fig. 2B.

In the claims:

In Column 28, Line 27, Claim 1, after "inventory item;" delete "and"; and
In Column 29, Line 9, Claim 7, replace "value a" with --value of--.

Signed and Sealed this
Ninth Day of December, 2014

Michelle K. Lee
*Deputy Director of the United States Patent and Trademark Office*

ALERT! 241

THE MARKET VALUE OF INVENTORY ITEM A IS ESTIMATED TO HAVE DECREASED TO $1.00. THE PURCHASE PRICE FOR INVENTORY ITEM A WAS $1.50. CONSEQUENTLY THE MARKET PRICE FOR INVENTORY ITEM A IS $0.50 BELOW THE PURCHASE PRICE. YOU HAVE 1000 UNITS OF INVENTORY ITEM A IN STOCK. CONSEQUENTLY YOUR CURRENT STOCK OF INVENTORY ITEM A YIELDS AN ESTIMATED $500.00 LOSS

Please Indicate Receipt of this Alert by Clicking on the "RECEIVED" Box Provided Below

243 ☐ RECEIVED

240

FIG. 2B